United States Patent [19]

Agapiou et al.

[11] Patent Number: 5,431,513
[45] Date of Patent: Jul. 11, 1995

[54] ADJUSTABLE BORING BAR WITH IMPROVED ACCURACY

[75] Inventors: John S. Agapiou, Sterling Heights; Robert B. Trent, Farmington Hills; Craig R. Brooks, Harrison Twp., all of Mich.

[73] Assignee: General Motors Corporation, Detroit, Mich.

[21] Appl. No.: 280,641

[22] Filed: Jul. 25, 1994

[51] Int. Cl.⁶ .............................................. B23B 27/00
[52] U.S. Cl. .................................... 408/188; 408/150
[58] Field of Search ............... 408/150, 151, 186, 187, 408/188

[56] References Cited

U.S. PATENT DOCUMENTS

| | | | |
|---|---|---|---|
| 2,289,069 | 7/1942 | Radermacher | 408/188 |
| 2,676,501 | 4/1954 | North | 408/188 |
| 2,693,965 | 11/1954 | Briney, Jr. | 408/151 |
| 3,961,857 | 6/1976 | Koblesky | 408/150 |
| 4,396,319 | 8/1983 | Miles | 408/155 |
| 4,507,027 | 3/1985 | Adamson et al. | 408/197 |
| 4,582,457 | 4/1986 | Belttari | 408/159 |
| 4,619,564 | 10/1986 | Jacobson | 408/146 |
| 4,773,801 | 9/1988 | Noggle | 409/234 |
| 4,850,757 | 7/1989 | Stashko | 408/179 |
| 5,193,950 | 3/1993 | Hunt | 408/153 |

FOREIGN PATENT DOCUMENTS

| | | | |
|---|---|---|---|
| 45308 | 4/1981 | Japan | 408/150 |
| 19610 | 2/1985 | Japan | 408/151 |
| 141409 | 7/1985 | Japan | 408/150 |

*Primary Examiner*—Daniel W. Howell
*Attorney, Agent, or Firm*—Patrick M. Griffin

[57] ABSTRACT

An adjustable boring bar assembly is provided in which the cutting radius can be altered by predetermined increments simply by releasing and turning the bar within a sleeve of a hydraulic holder. The holder sleeve is slightly eccentrically located relative to the spindle axis, so that turning of the bar effectively changes the working radius of the cutting point. Slots on the holder, arrayed about the sleeve, are located at discrete angular positions to produce the desired radial increments. A pin on the boring bar disengages from one slot and reseats in another when the bar is released, withdrawn, turned, reinserted and re-gripped.

1 Claim, 4 Drawing Sheets

ADJUSTABLE BORING BAR WITH IMPROVED ACCURACY

TECHNICAL FIELD

This invention relates to adjustable boring bars in general, and specifically to a tool that can be quickly and easily adjusted, with improved accuracy.

BACKGROUND OF THE INVENTION

Rotating hole boring tools, generally known as boring bars, are used to accurately size a bore that has already been drilled or cast in place in an object such as an engine block. A cutting point or insert is fixed to a solid body cutter body which is releasably gripped in a holder that is in turn powered by a machine spindle. The cutter body can thus be removed from the holder and spindle for service or replacement. The cutting point may have a single, fixed radius relative to the axis of rotation, in which case it can bore only a single size hole. With wear or slippage, the cutting point cuts an inaccurate bore, generally undersized, but possibly oversized. Therefore, boring bars in which the cutting point can be adjusted radially in or out on the bar, and thus change the effective cutting radius relative to the spindle axis, are commercially available. Generally, these are used not so much to cut a range of hole sizes as to provide adjustment, with use and wear, but to keep the nominal hole size accurate.

A common adjustment scheme provides a dial mechanism located between the cutting point and bar that shifts the point in or out continuously. Some kind of threaded clamp has to be released and then retightened to make the adjustment. An example may be seen in U.S. Pat. No. 4,396,319 to Miles. The advantage of a continuously adjustable boring bar is also its inherent drawback, in effect. The clamp that allows the adjustment to be can also slip in use, and the cutting point is not as rigidly or stiffly held as it is a non-adjustable tool. Tool chatter and hold size inaccuracy can result. Furthermore, the very act of adjusting a cutting point by releasing a clamp means, moving it, and reclamping it is fraught with potential inaccuracy. The operator has to somehow hold the point in the proper position during reclamping, and it can shift.

A different adjustment scheme leaves the cutting point solidly and immovably secured to its boring bar, as in a standard boring bar, but retains the boring bar within a holder sleeve that is eccentric or offset relative to the main axis of spindle-holder rotation. The bar can be released, turned continuously to any angular position relative to the holder and, and reclamped into its new position. Because of the axis eccentricity, turning the bar within the sleeve changes the cutting point's effective cutting radius relative to the main axis of spindle rotation, just as directly moving the cutting point on the bar would do. However, since there is more potential surface area of physical contact between the boring bar and its holder than there is between the small cutting point itself and the boring bar, such a scheme is potentially more solid.

An example of the eccentric bar type of adjustment may be seen in U.S. Pat. No. 4,057,027 to Adamson et al. It is still not as solid or accurate as a non-adjustable boring bar. In the embodiment disclosed, the boring bar and holder have abutted circular flanges, one of which has dial typed gradations engraved on it. A solid, removable key fitted between the abutted flanges keeps the boring bar solid and rigid to the holder as an initial or rough cut is made. For later adjustment to make a finer cut, the solid key is removed, and two other clamps are released in order to allow the bar to be turned. One clamp is an exterior leg type clamp hooked over the boring bar flange, which does not fit down into any indentations, and so cannot be relied on to provide any real solidity. What the exterior clamp does is hold the flanges together temporarily while a secondary, internal cam clamp is tightened. The secondary clamp consists of a threaded bolt and a knurled wedge that pulls radially inwardly against splines on the boring bar shank to clamp it in place. While more solid than a movable point type of adjuster, it still suffers from the same inherent problems. That is, the flange has to be held temporarily in its adjusted angular position before the cam clamp is tightened down, and is subject to slippage. Furthermore, the radially engageable teeth on the wedge do not provide a lot of engaged surface area between it and the bar shank to prevent chattering during operation. Threaded bolts are also inherently subject to backing out. And, of course, the adjustment process is complicated in that it requires the loosening and retightening of two bolts, not counting the removal of the slotted key initially. These operations are all extra operations, above and beyond the basic operations of releasing, turning and regripping the boring bar in the holder.

SUMMARY OF THE INVENTION

The invention provides an improved adjustable boring bar of the eccentric type that is substantially as solid, accurate and chatter free as a solid, non-adjustable tool. No significant adjustment operations beyond simply releasing, turning and regripping the boring bar are necessary.

In the embodiment disclosed, a tool holder is fixed to a machine spindle, and rotates therewith about a main or central axis. The holder has a sleeve that is adapted to tightly and releasably grip the cylindrical shank of a solid boring bar, through a hydraulic action. The holder can be quickly and easily released by an operator, simply by turning a release valve. The sleeve axis is offset slightly relative to the central spindle rotation axis by a known amount. The holder is a solid, rigid part with an integral annular shoulder that surrounds the sleeve. Cut into the shoulder is a series of discrete slots, arrayed in a spoke like pattern.

The boring bar is a solid piece, with a cylindrical shank gripped in the holder sleeve and a rigidly secured cutting point. A pin protrudes from the side of the boring bar, just above the shank and perpendicular to the bar axis. The pin is sized to fit closely in any one of the slots in the shoulder. The slots, in turn, have an angular position predetermined so as to give an incremental adjustment to the cutting point's effective radius. The operator can make an incremental change in the cutting radius by releasing the bar shank and withdrawing it slightly from the sleeve, which simultaneously disengages the pin. Then, the bar is turned to at least roughly align the pin with the selected new slot, and the bar is reinserted, which simultaneously engages the pin with the new slot. The bar is then regripped in the holder. There are no threaded fasteners to loosen, no gauges to read, and no necessity of holding a fine adjustment temporarily in place while a clamp is tightened. The pin and slot interfit in a self-seating, self-aligning fashion, which aids in the adjustment process, and have no ill effect on the cutting operation, which is carried out with minimal chatter.

DESCRIPTION OF THE PREFERRED EMBODIMENT

These and other features of the invention will appear from the following written description, and from the drawings, in which.

Figure 1:
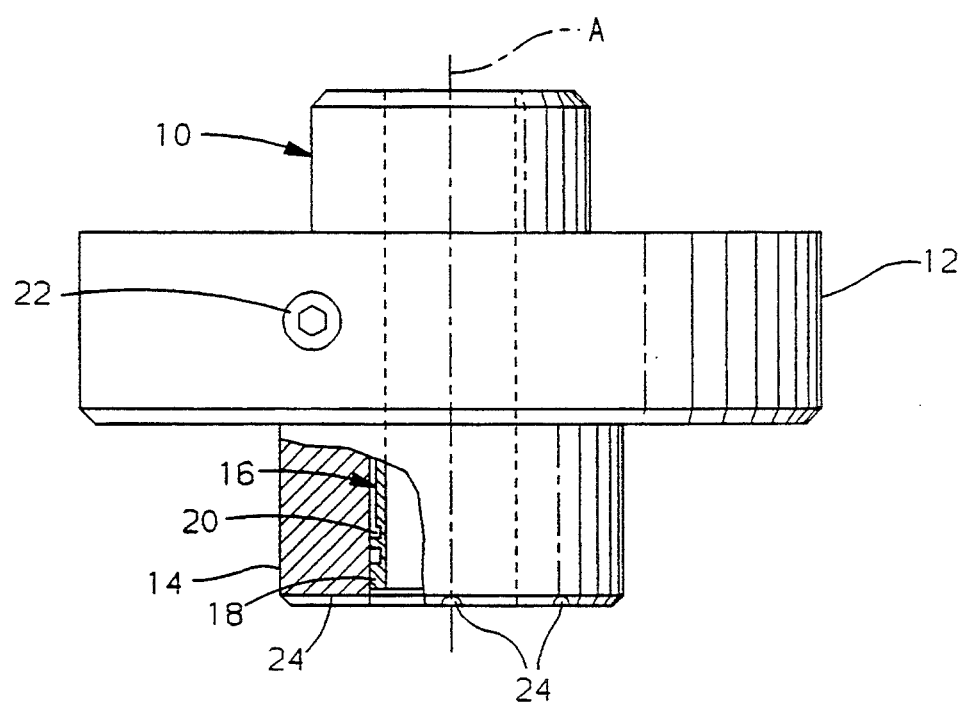
FIG. 1 is a view of the hydraulic holder and sleeve, partially broken away.
Figure 2:
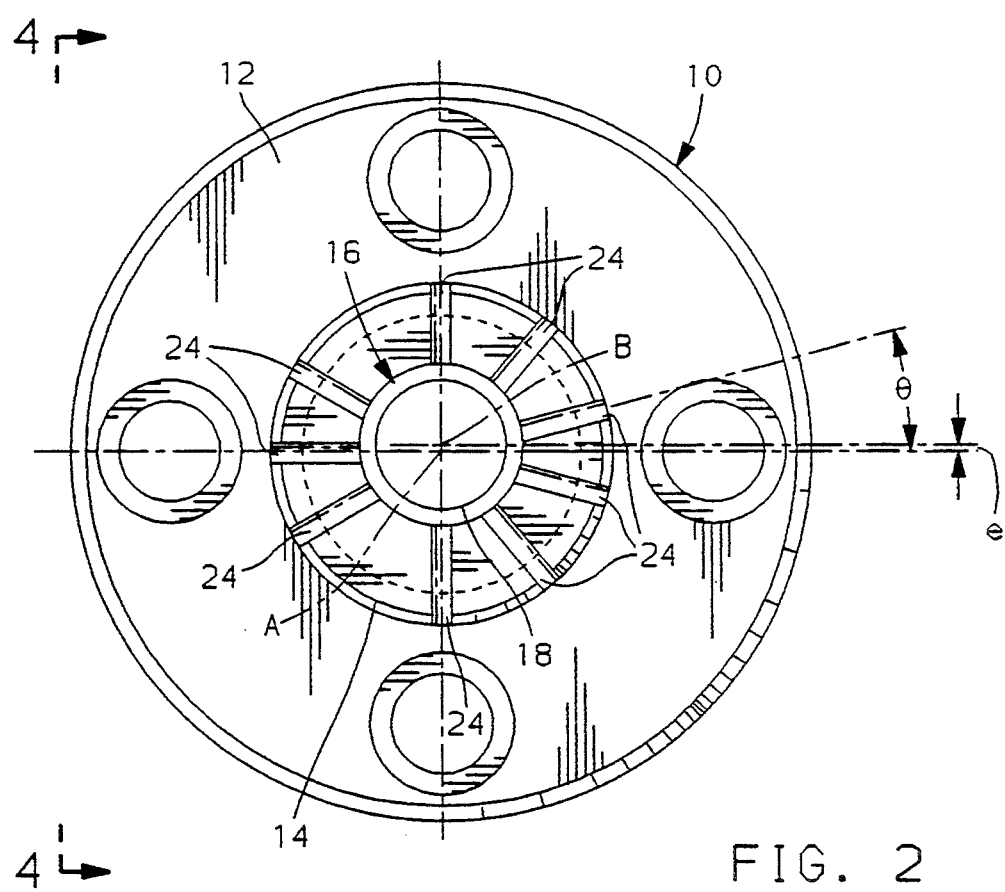
FIG. 2 is an axial end view of the holder, looking into the sleeve.

Referring first to FIGS. 1 and 2, a hydraulic holder, indicated generally at 10, is a basically cylindrical, solid piece of machined steel, with a solid outer mounting flange 12 approximately four inches in diameter and an inch thick axially, which would be solidly bolted to the non-illustrated spindle of a boring machine. As such, holder 10 would spin about a main, central axis, indicated at A. Integral to flange 12 is a rigid shoulder 14, approximately two inches in diameter and an inch high axially, which is solid, but for an internal cylindrical sleeve 16 approximately three fourths of an inch in diameter. Sleeve 16 is more complex than a simple bore, containing an internal liner 18 backed by hydraulic fluid passages 20. Pressurized hydraulic fluid, which would be supplied through the spindle, can be admitted or excluded from the passages 20 by the operator turning a valve 22. When pressurized, the liner 18 tightly grips whatever cylindrical object is closely contained in it. A conventional tool holder would normally be used with a non-adjustable, solid boring bar, and so sleeve 16 would be concentric to the spindle rotation axis. Such a unit rotates and cuts very rattle free, with minimal chatter. Differences in holder 10 allow for adjustability, but still provide the same quality of operation.

Referring next to FIG. 2, holder 10 differs from a conventional unit in two notable respects. The axis of sleeve 16, denoted at B, is parallel to, but offset slightly from, the main axis A, with an eccentricity e of approximately four thousandths of an inch. Obviously, this small eccentricity would not be visible, and is exaggerated in the drawing. Secondly, the top surface of shoulder 14 has a series of nine slots 24 machined across it. Slots 24 extend radially across the whole top surface of shoulder 14. Since shoulder 14 is fairly thick radially, the slots 24 have a length of just over half an inch. They are semi-circular in cross section, and approximately 0.0625 inches deep axially, at their bottom dead center. The slots 24 are arrayed in a spoke like pattern, radiating from the center axis A, but are not evenly spaced. Instead, they are at angular increments $\theta$, measured from the 3 o'clock position, which are predetermined to give a designed increment of cutting adjustment. A table below gives further explanation. It should be noted, however, that the slots 24 are labeled positive and negative 1 through 4, and O, and could be so labeled on the holder 10 itself.

Figures 3, 4:
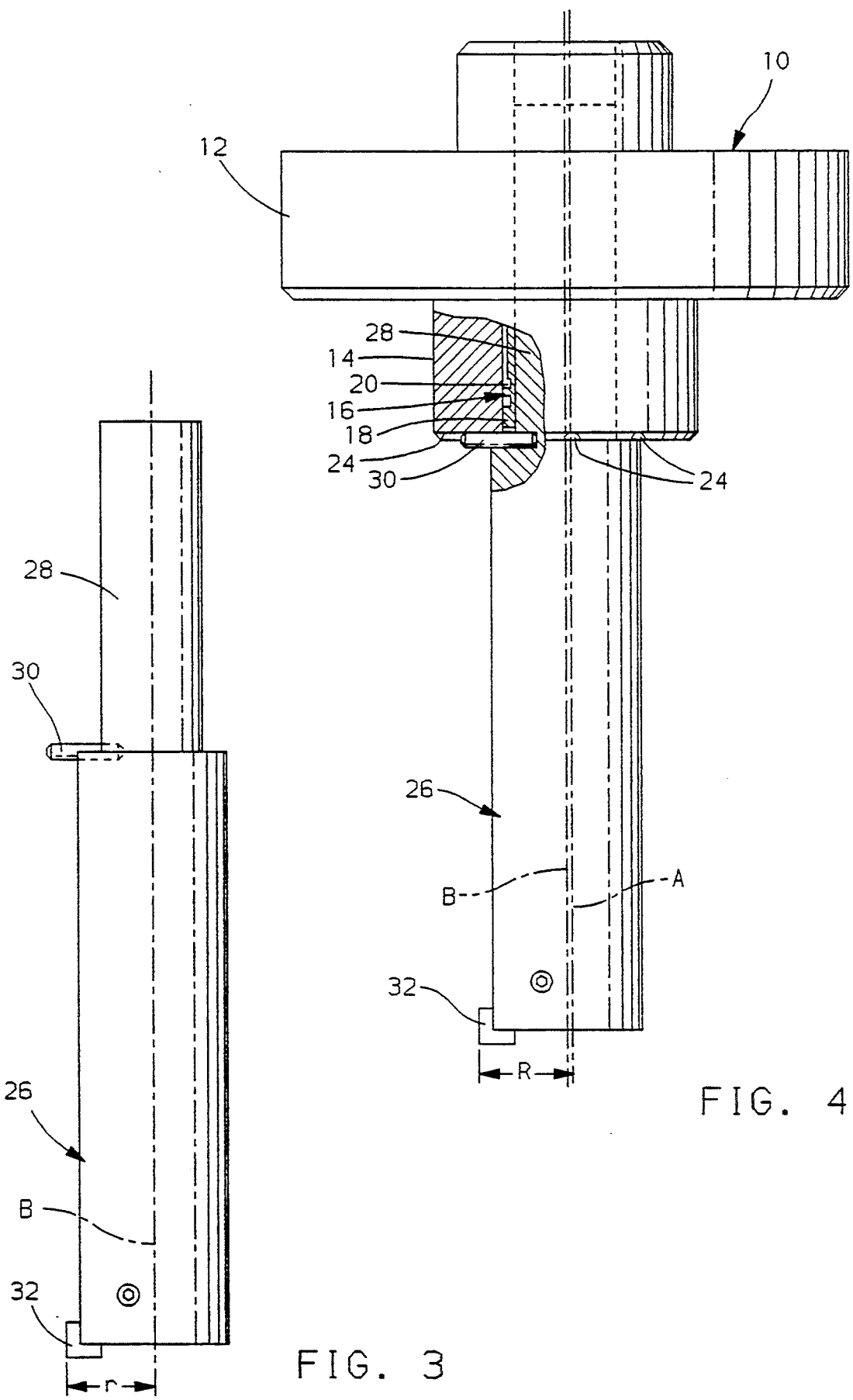
FIG. 3 is a view of the boring bar alone.
FIG. 4 is a view of the boring bar held in the holder and fixed in one position, with the pin in one slot, as viewed from line 4—4 of FIG. 2.

Referring next to FIGS. 3 and 4, a boring bar, indicated generally at 26, is a solid steel cylinder of stepped shape with a basic diameter of one inch, and a smaller diameter shank 28 of approximately three fourths of an inch diameter. Shank 28 is just over two inches long, and bar 26 is approximately six and a half inches in total length. At the juncture between shank 28 and the rest of bar 26 is a round pin 30, about 0.125 inches in diameter, which is solidly inset into, and which protrudes about a quarter of an inch perpendicularly from, the side of bar 26. A standard tool bit or cutting point 32 is securely fixed to the end of bar 26, just as it would be with a non-adjustable tool. The radius r of the cutting point 32 relative to its own axis B is 0.625 inches, as shown in FIG. 3. This is the radius at which it would cut if bar 26 were mounted concentrically to spindle axis A. However, since it is eccentrically mounted, it will have a different effective cutting radius R, as shown in FIG. 4. R is the radius at which the cutting point 32 will actually cut relative to the spindle axis A.

Referring again to FIG. 2, what R will be depends on its particular angular position $\theta$ chosen, which is a function of the particular slot 24 where pin 30 is located. The mathematical equation for determining R in terms of r, e and $\theta$ is $R^2(\theta) = r^2 + e^2 - 2 \times r \times e \times \cos(\theta - \alpha)$, in which, using a standard X-Y axis reference frame (X axis being the 3 o'clock position), $\alpha$ is the angle between the axis B and the X axis. $\alpha$ is 90 degrees here, meaning that B is at the 12 o'clock position relative to A, which simplifies the calculations. What the tool designer would do would be to determine the increments in R that would produce the particular bore tolerances desired. Here, for example, it was decided that it would be desirable to be able to produce four one thousandth inch increments in either direction, up or down, from the nominal 0.625 inch radius. Then, with a 0.004 inch eccentricity e, the necessary angles $\theta$ were calculated. It is not necessary to reproduce the calculations here, but the following table gives the various values:

| SLOT ANGLES CORRESPONDING TO ONE THOUSANDTH INCREMENTS WITH .004 ECCENTRICITY | | |
| --- | --- | --- |
| EFFECTIVE RADIUS R | INCREMENT FROM NOMINAL | SLOT ANGLE $\theta$ |
| .629 | +4 | 90 |
| .628 | +3 | 48.5 |
| .627 | +2 | 150.2 |
| .626 | +1 | 14.3 |
| .625 | 0 | 180 |
| .624 | −1 | −14.7 |
| .623 | −2 | −149.8 |
| .622 | −3 | −48.7 |
| .621 | −4 | −90 |

Referring next to FIG. 4, the operation of the preferred embodiment is described. FIG. 4 shows the boring bar 26 held in one position, with pin 30 in a selected slot 24. For example, pin 30 could be in the zero increment slot. This would be chosen to give the effective radius R equal to the nominal radius of 0.625 inches, when there was no significant wear to the cutting point 32 and no other influences moving it out of nominal position. The round pin 30 fits down closely into the matching semi-circular cross section slot 24 with no significant play or rattle in any direction, and thereby locates the cutting point very accurately at the chosen angle. While the slots 24 are centered on A, not B, the eccentricity between A and B is so small that pin 30 matches the slots 24 without binding. The boring bar shank 28 is gripped within sleeve 16 just as tightly as it would be in a conventional holder. Stated differently, the pin 30 and slot 24 have no deleterious effect on how sleeve 16 works and, if anything, add resistance to shank 28 turning within sleeve 16. Therefore, cutting point 32 cuts just as accurately and chatter free, at any selected effective radius, as it would in a concentrically mounted, non-adjustable boring bar. The only potential effect on cutting operation is that the eccentricity of sleeve 16, as slight as it is, would have to be weight counterbalanced somehow within the body of holder 10, to rotate at high speed without whirl. Such balancing of cutter bodies is commonly done even in non adjustable designs, as will be appreciated by those familiar with commercial practice.

Figure 5:
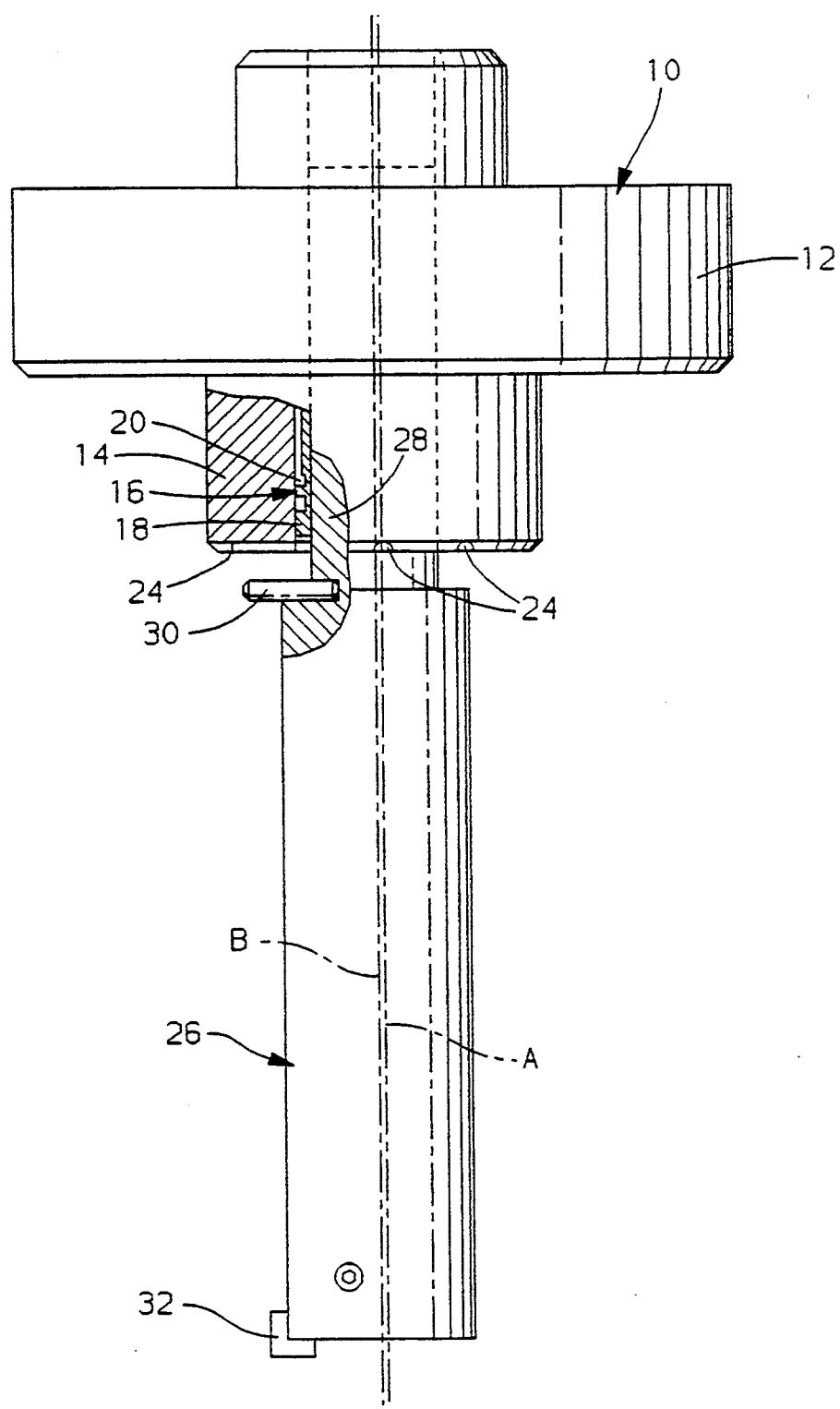
FIG. 5 is a view like FIG. 4, but showing the boring bar released from the holder and moved slightly axially out to remove the pin from the slot.
Figure 6:
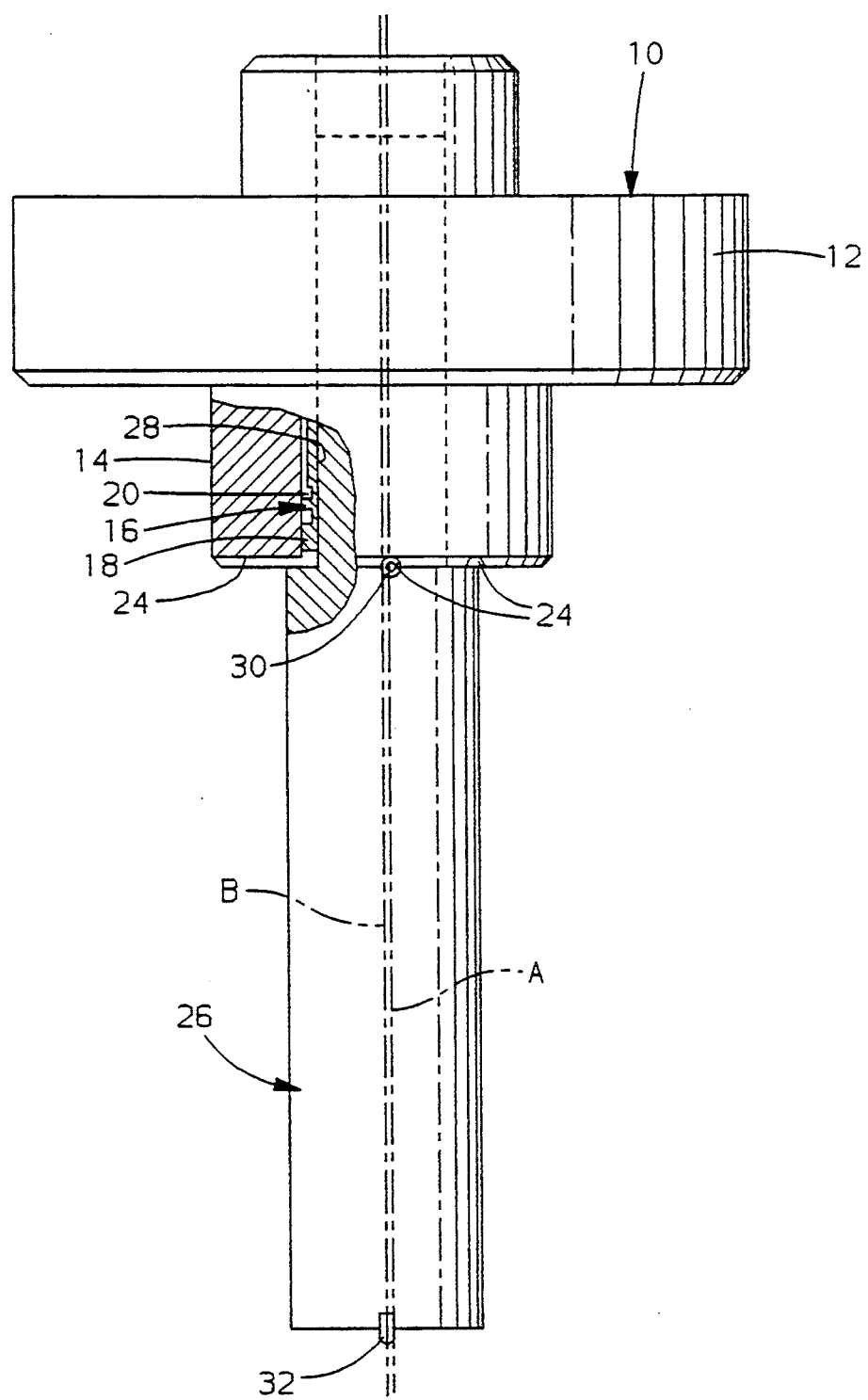
FIG. 6 is a view like 4, but showing the pin moved to a different slot.

Referring next to FIGS. 5 and 6, the adjustment process is illustrated. In operation, it will necessary to adjust the effective cutting radius up or down for various reasons. Most likely, wear of the cutting point 32 would require a positive increment. Or, at set up, a new boring bar 26 might be discovered to have inaccuracies requiring a negative increment. Regular monitoring of bore size would indicated whether an adjustment within the radial increments available was in order. Producing either an increase or decrease is done by releasing shank 28, pulling it and bar 26 axially out far enough to simultaneously pull pin 30 out of its current slot 24, and then turning it so as to at least partially align pin 30 with the new selected slot 24. Then, shank 28 is reinserted, and pin 30 seats itself in the new slot 24. This process is very easy for an operator, in that no fine dial gradations need to be read, and the round cross section of pin 30 will seat itself within the matching slot 24 in a way that is visually and tactually obvious. Then, sleeve 16 is retightened, as shown in FIG. 6. Beyond pulling, turning, and retightening, all the operator need do is roughly align pin 30 with the correct slot 24. Therefore, an incremental radius change is no more difficult to make than it would be just to exchange one non-adjustable boring bar for another, and in fact quicker, since the shank 28 does not have to be completely removed from sleeve 16.

Variations in the preferred embodiment could be made. The same basic adjustment scheme is potentially adaptable to hold boring tools, such as indexable drills, that actually cut a hole into a solid block, as opposed to finish sizing a predrilled hole. Any kind of holder that could be quickly released and retightened around a bar shank, and which allowed the released boring bar to move axially out far enough to turn it or index it to another angular position, could be used. The slots 24 are a convenient means for locating the bar 26 and its cutting point 32 at different working radii increments, and are simple to machine across the top surface of the shoulder 14 that already surrounds sleeve 16. Other locating means could include, for example, a peg that could be inserted into a selected one of a series of peg holes drilled axially into holder 10 in a circular array about sleeve 16. It is an added advantage if the structural features that comprise the locating means have complementary convex and concave shapes, such as the pin and slot disclosed, so that only a rough angular alignment is necessary before the boring bar is pushed axially back into the sleeve and regripped. To accomplish a similar, self-seating function with a peg and holes, the holes could be given a funnel shaped lead in surface. Or, the same basic slot 24 could be given a triangular cross section, to mate with a pin of complementary, triangular cross section. The pin 30 could comprise some other means suitable to seat in a slot and locate the boring bar in a selected angular position, such as a rib integrally machined onto the bottom surface of a flange surrounding bar 26, and abuttable with the end surface of shoulder 14. In general, a suitable locating means could comprise any axially interengageable structural features that are integral to or fixed to the bar and holder and which are disengaged and reengaged simultaneously with, and just with, the axial motion of the bar. It is also helpful if the structural features, as they reengage, have a complementary concave and convex shape, like a round pin and semi circular cross section slot, or like a saw tooth and at triangular cross section slot. Then, they will reengage in a fashion that is self-aligning and self-seating, as well as being easily sensed by sight and feel, with no necessity for maintaining a fine alignment during a re clamping procedure. Therefore, it will be understood that it is not intended to limit the invention to just the embodiment disclosed.

The embodiments of the invention in which an exclusive property or privilege is claimed are defined as follows:

1. An adjustable boring bar assembly, comprising,
  a generally cylindrical boring bar with a rigidly mounted cutting point having a fixed radius measured relative to the tool body axis, said boring bar further having a pin rigidly fixed thereto and extending perpendicularly therefrom,
  a holder rotatable about a main, central axis, said holder having a sleeve defined by a surrounding shoulder and adapted to grip said boring bar and release it so that said boring bar can be moved partially axially out of said sleeve and turned within said sleeve, said sleeve having a secondary axis which is parallel to and radially offset from said main axis by a predetermined amount, so that said cutting point moves by radial increments relative to said main axis when said boring bar is turned to predetermined angular positions relative to said holder, said sleeve shoulder further having an array of slots with an axial depth formed thereon, each of which slots corresponds to one of said angular positions and each of which is axially interengageable with said boring bar pin,
  whereby said cutting point may be moved in radial increments by releasing said boring bar and withdrawing it partially from said sleeve axially far enough to simultaneously remove said pin from its current slot, turning said boring bar within said holder sleeve so as to align said pin with a new slot, and axially re inserting said boring bar into said sleeve and re gripping said boring bar.

* * * * *